United States Patent
Gunderman, Jr.

(10) Patent No.: US 7,757,432 B2
(45) Date of Patent: Jul. 20, 2010

(54) ELECTRONIC CARPENTER BEE TRAP

(76) Inventor: Robert Dale Gunderman, Jr., 4149 Clover St., Honeoye Falls, NY (US) 14472

( * ) Notice: Subject to any disclaimer, the term of this patent is extended or adjusted under 35 U.S.C. 154(b) by 716 days.

(21) Appl. No.: 11/456,210

(22) Filed: Jul. 9, 2006

(65) Prior Publication Data

US 2007/0006519 A1 Jan. 11, 2007

Related U.S. Application Data

(60) Provisional application No. 60/698,203, filed on Jul. 11, 2005.

(51) Int. Cl.
   - A01M 1/22 (2006.01)
   - A01M 1/02 (2006.01)
   - A01M 1/10 (2006.01)

(52) U.S. Cl. .......................... 43/112; 43/107

(58) Field of Classification Search .............. 43/112, 43/98, 113, 107
See application file for complete search history.

(56) References Cited

U.S. PATENT DOCUMENTS

| | | | | |
|---|---|---|---|---|
| 550,345 A * | 11/1895 | Humphreys et al. | ........... | 43/113 |
| 590,121 A * | 9/1897 | Vaughan | ........... | 43/98 |
| 881,055 A * | 3/1908 | Chaulin | ........... | 43/112 |
| 1,150,835 A * | 8/1915 | Satinover | ........... | 43/112 |
| 1,239,501 A * | 9/1917 | Mason | ........... | 43/112 |
| 1,364,949 A * | 1/1921 | Niewinski | ........... | 43/122 |
| 1,429,691 A * | 9/1922 | Pandolfo | ........... | 43/112 |
| 1,463,091 A * | 7/1923 | Pearson | ........... | 43/98 |
| 1,482,420 A * | 2/1924 | Wilson | ........... | 43/113 |
| 1,666,723 A * | 4/1928 | Trumbo | ........... | 43/112 |
| 1,667,876 A * | 5/1928 | Steiner | ........... | 43/113 |
| 1,852,923 A * | 4/1932 | Folmer et al. | ........... | 43/112 |
| 1,871,978 A * | 8/1932 | Frost | ........... | 43/112 |
| 1,946,509 A * | 2/1934 | Trammell | ........... | 43/113 |
| 1,962,420 A * | 6/1934 | Bradley | ........... | 43/112 |
| 1,962,439 A * | 6/1934 | Folmer et al. | ........... | 43/112 |
| 1,985,921 A * | 1/1935 | Felmer | ........... | 43/112 |
| 2,003,513 A * | 6/1935 | Myers | ........... | 43/98 |
| 2,038,495 A * | 4/1936 | Keller | ........... | 43/112 |
| 2,038,719 A * | 4/1936 | Davidson | ........... | 43/112 |
| 2,061,458 A * | 11/1936 | Folmer et al. | ........... | 43/112 |
| 2,095,986 A * | 10/1937 | Koike | ........... | 43/113 |

(Continued)

FOREIGN PATENT DOCUMENTS

DE 3926573 A1 * 3/1990

(Continued)

Primary Examiner—Darren W Ark
(74) Attorney, Agent, or Firm—Patent Technologies, LLC

(57) ABSTRACT

A carpenter bee trap having a housing that contains a hole, an electrode in proximity to the hole, and a power source connected to the electrode. The hole is of a size similar to the size holes that carpenter bees normally make, thus attracting the carpenter bees to the hole. The carpenter bees will enter the hole, and make contact with an electrode. The electrode is energized through connection with a power source. In one embodiment, the power source includes a photovoltaic panel. Once the carpenter bee makes contact with the electrode, a high voltage discharge will take place through the body of the carpenter bee, thus killing the carpenter bee. The carpenter bee will then fall from the hole, and the trap will be ready for the next carpenter bee to enter.

20 Claims, 7 Drawing Sheets

U.S. PATENT DOCUMENTS

| | | | | |
|---|---|---|---|---|
| 2,098,647 A * | 11/1937 | Lindsley | | 43/112 |
| 2,191,127 A * | 2/1940 | Hazel | | 43/98 |
| 2,302,787 A * | 11/1942 | Meehan | | 43/98 |
| 2,307,163 A * | 1/1943 | Shea | | 43/112 |
| 2,468,227 A * | 4/1949 | Nagel | | 43/113 |
| 2,475,181 A * | 7/1949 | Gardenhour | | 43/112 |
| 2,475,182 A * | 7/1949 | Gardenhour | | 43/112 |
| 2,637,408 A * | 5/1953 | Yadoff | | 43/112 |
| 2,821,806 A * | 2/1958 | Anderson | | 43/112 |
| 2,835,071 A * | 5/1958 | Partridge | | 43/112 |
| 2,917,863 A * | 12/1959 | Anderson et al. | | 43/112 |
| 3,023,539 A * | 3/1962 | Emerson, Jr. | | 43/113 |
| 3,108,391 A * | 10/1963 | Sipos | | 43/112 |
| 3,163,871 A * | 1/1965 | Palmer | | 449/47 |
| 3,187,458 A * | 6/1965 | Densmore | | 43/113 |
| 3,366,854 A * | 1/1968 | Robinson | | 43/98 |
| 3,388,497 A * | 6/1968 | Levine | | 43/98 |
| 3,789,537 A * | 2/1974 | Rule et al. | | 43/112 |
| 3,792,547 A * | 2/1974 | Day | | 43/98 |
| 3,803,753 A * | 4/1974 | Feigin et al. | | 43/132.1 |
| 3,823,506 A * | 7/1974 | Iannini | | 43/112 |
| 4,109,408 A * | 8/1978 | Yavnieli | | 43/112 |
| 4,144,668 A * | 3/1979 | Darncharnjitt | | 43/112 |
| 4,248,005 A * | 2/1981 | Hedstrom | | 43/112 |
| 4,254,519 A * | 3/1981 | Vick et al. | | 449/47 |
| 4,274,123 A * | 6/1981 | Rogers, Jr. | | 43/98 |
| 4,276,712 A * | 7/1981 | Zeldov et al. | | 43/112 |
| 4,300,306 A * | 11/1981 | Hudgin | | 43/112 |
| 4,423,564 A * | 1/1984 | Davies et al. | | 43/121 |
| 4,551,941 A * | 11/1985 | Schneidmiller | | 43/107 |
| 4,696,126 A * | 9/1987 | Grothaus et al. | | 43/112 |
| 4,739,531 A * | 4/1988 | Robson | | 449/47 |
| 4,852,296 A * | 8/1989 | Swanson et al. | | 43/112 |
| 4,856,226 A * | 8/1989 | Taylor | | 43/113 |
| 4,858,374 A * | 8/1989 | Clemons | | 43/122 |
| D306,061 S * | 2/1990 | Cutter | | D22/122 |
| 4,908,978 A * | 3/1990 | Zacharias | | 43/112 |
| 4,914,854 A * | 4/1990 | Zhou et al. | | 43/112 |
| 4,951,414 A * | 8/1990 | Mewissen | | 43/112 |
| 4,959,923 A * | 10/1990 | Aiello et al. | | 43/112 |
| 5,004,446 A * | 4/1991 | Guong-Hong | | 43/112 |
| 5,015,212 A * | 5/1991 | Spangler et al. | | 449/2 |
| 5,241,779 A * | 9/1993 | Lee | | 43/112 |
| 5,280,684 A * | 1/1994 | Filonczuk | | 43/112 |
| 5,339,563 A * | 8/1994 | Job | | 43/122 |
| 5,347,748 A * | 9/1994 | Moreland et al. | | 43/112 |
| 5,461,822 A * | 10/1995 | Green et al. | | 43/107 |
| 5,632,115 A * | 5/1997 | Heitman | | 43/112 |
| 5,685,109 A * | 11/1997 | Rimback | | 43/122 |
| 6,134,826 A * | 10/2000 | Mah | | 43/112 |
| 6,202,343 B1 * | 3/2001 | Mah | | 43/112 |
| 6,341,444 B1 * | 1/2002 | Cina et al. | | 43/112 |
| 6,364,738 B1 * | 4/2002 | Kendell et al. | | 449/4 |
| 6,393,759 B1 * | 5/2002 | Brown et al. | | 43/113 |
| 6,530,172 B2 * | 3/2003 | Lenz | | 43/112 |
| 6,530,173 B2 * | 3/2003 | Meade et al. | | 43/112 |
| 6,564,503 B1 * | 5/2003 | Miyahara et al. | | 43/112 |
| 6,568,124 B1 * | 5/2003 | Wilbanks | | 43/112 |
| 6,574,914 B2 * | 6/2003 | Smith | | 43/113 |
| 6,594,946 B2 * | 7/2003 | Nolen et al. | | 43/112 |
| 6,609,330 B1 * | 8/2003 | Heitman | | 43/112 |
| 6,665,979 B1 * | 12/2003 | Hsu | | 43/112 |
| 6,766,611 B2 * | 7/2004 | Prince | | 43/58 |
| 6,786,001 B1 * | 9/2004 | Piper et al. | | 43/112 |
| 6,817,139 B1 * | 11/2004 | Powell et al. | | 43/113 |
| 7,073,287 B2 * | 7/2006 | Lau | | 43/112 |
| 7,284,350 B2 * | 10/2007 | Nelson et al. | | 43/113 |
| 2003/0079398 A1 * | 5/2003 | Holmes | | 43/113 |
| 2005/0155277 A1 * | 7/2005 | Bagnall et al. | | 43/113 |
| 2006/0143974 A1 * | 7/2006 | Pollmann | | 43/112 |
| 2007/0039236 A1 * | 2/2007 | Geier et al. | | 43/112 |
| 2007/0144056 A1 * | 6/2007 | Gleason, Jr. | | 43/112 |
| 2007/0175085 A1 * | 8/2007 | Chen | | 43/112 |
| 2008/0052982 A1 * | 3/2008 | Windsor | | 43/107 |
| 2009/0094883 A1 * | 4/2009 | Child | | 43/112 |

FOREIGN PATENT DOCUMENTS

| | | | |
|---|---|---|---|
| DE | 10153248 A1 * | 5/2003 | |
| EP | 341777 A1 * | 11/1989 | |
| FR | 2576748 A1 * | 8/1986 | |
| FR | 2855014 A1 * | 11/2004 | |
| GB | 963439 A * | 7/1964 | |
| GB | 2380387 A * | 4/2003 | |
| GB | 2381181 A * | 4/2003 | |
| JP | 07203821 A * | 8/1995 | |
| JP | 08332015 A * | 12/1996 | |
| JP | 2003023908 A * | 1/2003 | |
| JP | 2004261095 A * | 9/2004 | |
| JP | 2005013232 A * | 1/2005 | |
| SU | 718066 A * | 2/1980 | |
| SU | 727186 A * | 4/1980 | |
| SU | 736916 B * | 5/1980 | |
| SU | 1662458 A * | 7/1991 | |
| WO | WO 9944418 A1 * | 9/1999 | |

* cited by examiner

ELECTRONIC CARPENTER BEE TRAP

CROSS-REFERENCE TO RELATED PATENT APPLICATIONS

This application claims the benefit of the filing date of U.S. provisional patent application No. 60/698,203 filed on Jul. 11, 2005.

BACKGROUND OF THE INVENTION

1. Field of the Invention

This invention relates generally to an insect trap, and more particularly to an electronic trap for carpenter bees and other insects.

2. Description of the Related Art

Carpenter bees are common in many areas, and can cause extensive damage to wooden structures. Carpenter bees cause damage to homes and buildings that are clad with a wooden siding or are constructed entirely of wood, such as a log home or a timber framed building. The carpenter bees bore a hole of up to ¾ inch in diameter into an outside component of a building such as a wooden fascia. The carpenter bee creates a tunnel in the wood that makes an approximate right angle turn once inside the wood. The tunnel is used by the female carpenter bee to lay eggs. This unsightly hole creates not only cosmetic flaws in the building, but the hole will also weaken the wood and create a point at which water can enter, causing further damage to the building. In addition, the hole can be used by other insects that further damage the wood, such as carpenter ants, termites, and the like. The male carpenter bee does not sting, but is a highly aggressive and territorial insect, often times becoming a significant nuisance to humans that are in proximity to the carpenter bee's hole. Often times the carpenter bee holes are near an outside deck or patio, and can greatly annoy the occupants of such a deck or patio.

The related art has disclosed numerous forms of pesticides that are used to kill flying insects such as hornets, wasps, bees, and the like. Such pesticides are often contained in an aerosol can that is capable of spraying an intense stream of pesticide in excess of twenty feet, providing a sufficient trajectory to reach most carpenter bee holes. Many of these pesticides will knock down an airborne insect that contacts the spray. The carpenter bee is a highly agile flyer, and can avoid a jet stream of pesticide while flying. Carpenter bee holes are often times sprayed with a pesticide in an attempt to control their damage. Unfortunately, it is extremely difficult to spray the carpenter bee eggs with pesticide because the carpenter bee tunnels make a right angle turn from their point of entry. These difficulties make the use of pesticides ineffective, and result in unnecessary and ineffective application of pesticides, causing significant environmental damage.

U.S. Pat. No. 6,766,611 entitled "Carpenter Bee Trap" discloses a plastic box with a hole to trap carpenter bees. The premise of such a trap is that the carpenter bees will enter the hole in the plastic box, and will be unable to find their way back out of the plastic box. For the few carpenter bees that are not physically able to locate the hole and exit the box, this leaves a live carpenter bee in the box that requires disposal.

It is an object of the present invention to provide a carpenter bee trap that does not rely on the use of harmful pesticides. It is another object of the present invention to provide a carpenter bee trap that does not require the user to dispose of a live carpenter bee. It is another object of the present invention to provide a carpenter bee trap that, in one embodiment of the present invention, uses solar power to kill carpenter bees. It is a further object of the present invention to provide a carpenter bee trap that is effective in eliminating carpenter bees from a dwelling or area.

BRIEF SUMMARY OF THE INVENTION

In accordance with the present invention, there is provided an electronic carpenter bee trap comprising a housing having a hole to entice carpenter bees to enter the housing, said hole being of a size similar to the holes normally made by carpenter bees, an electrode assembly in proximity to said hole, and a power source connected to said electrode. The foregoing paragraph has been provided by way of introduction, and is not intended to limit the scope of the following claims.

BRIEF DESCRIPTION OF THE DRAWINGS

The invention will be described by reference to the following drawings, in which like numerals refer to like elements, and in which.

Figure 1:
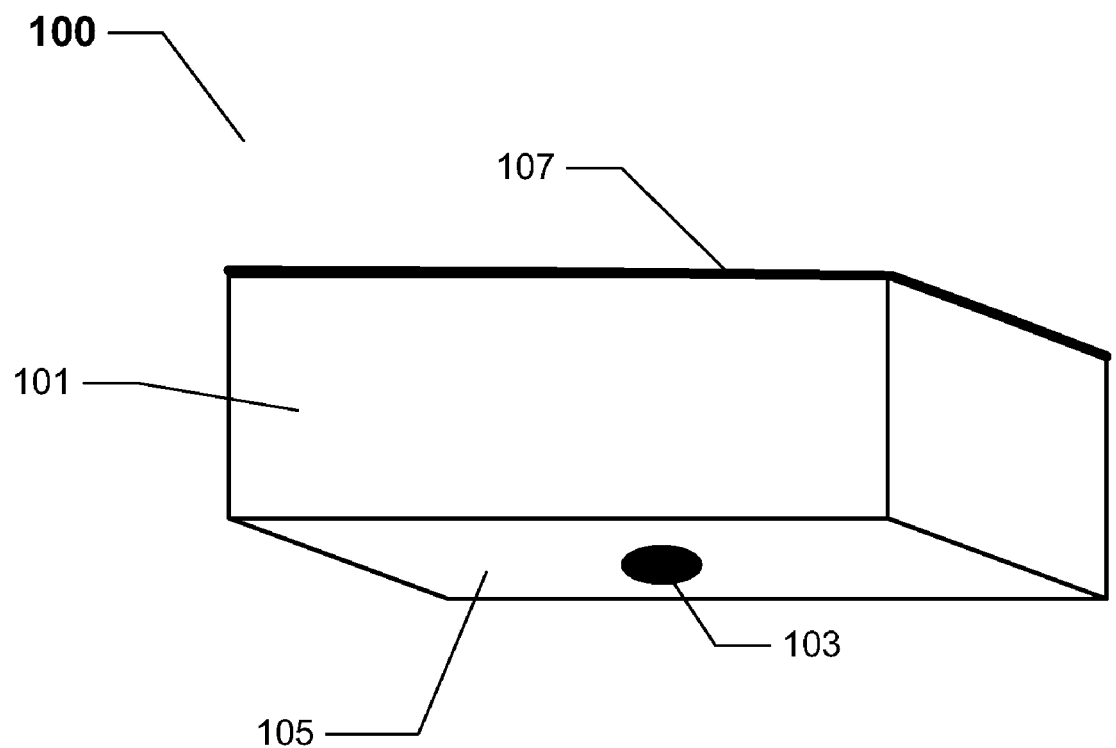
FIG. 1 is a perspective view of an electronic carpenter bee trap according to one embodiment of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a better understanding of the present invention, a short preface describing one attribute of the behavior of carpenter bees is essential. It is well known that carpenter bees bore holes in wood to create nests. The carpenter bees do not eat the wood, but use it merely to create a nest for laying eggs and raising young. The hole that is made by the carpenter bee is commonly about 5/16 to about ½ inch in diameter. Through experimental observation and studies conducted by the inventor, he has observed that carpenter bees will often times be attracted to a pre-existing hole, and if the hole is of the size frequently made by carpenter bees, the carpenter bee will preferentially use a pre-existing hole, apparently avoiding the effort involved in boring a new hole. The carpenter bee, upon encountering a pre-existing hole, will be attracted to the pre-existing hole, and will enter the pre-existing hole to investigate its possible use as a nesting site. The applicant conducted experiments in the spring and summer of 2004 to determine what characteristics of a pre-existing hole are necessary to entice a carpenter bee to enter a manmade hole. It was noted that a manmade hole of from about 5/16 inch to about ⅞ inch, made in wood, would entice a carpenter bee to enter the hole.

Carpenter bees preferred soft species of wood such as pine to hardwood species such as oak, cherry, or walnut. The present invention uses this behavioral trait of carpenter bees to attract and kill the carpenter bees before they have a chance to bore new holes in a home or building. By destroying the carpenter bees before they have a chance to reproduce, the area surrounding a home or building is kept free of carpenter bees and their related damage without the use of toxic pesticides. If a carpenter bee population around a home or building is left unchecked, the population can grow over several years, creating ongoing structural and cosmetic damage to the home or building. The inventor attached the Electronic Carpenter Bee trap to a gutter of his home in the spring of 2006, and by late June of 2006 he had completely eliminated the carpenter bee infestation and resulting wood damage to his home.

For a general understanding of the present invention, reference is made to the drawings. In the drawings, like reference numerals have been used throughout to designate identical elements.

FIG. 1 is a perspective view of an electronic carpenter bee trap 100 according to one embodiment of the present invention. Referring to FIG. 1, a housing 101 is shown. The housing may be rectangular in shape, or may be of any geometry that is convenient to produce. The shape of the housing 101 does not have as much of a bearing on the effectiveness of the electronic carpenter bee trap as the shape of the entry hole 103 does. The housing 101 may be made of wood, a preferred nesting material for carpenter bees. The housing 101 may also be made from recycled wood composite, plastic, aluminum, masonry, or any other material that is not repugnant to carpenter bees. The housing 101 contains an entry hole 103 with a diameter of from about ¼ inch to about 1 inch. In a preferred embodiment of the present invention, the diameter of the entry hole 103 is from about 5/16 inch to about ¾ inch. In proximity to the entry hole 103 are electrodes that will be more clearly illustrated and described by way of FIG. 4. The entry hole 103 may be located at any point on the surface of the housing 101. In one embodiment of the present invention, the entry hole 103 is located on the bottom 105 of the housing 101. As will be more clearly illustrated by way of FIGS. 4 and 5, the housing 101 contains electronics (not shown in FIG. 1) that energize electrodes that are located in proximity to the entry hole 103. The electronics are powered, in one embodiment of the present invention, by a solar panel 107 that is attached to the housing 101. The housing 101 may, in some embodiments of the present invention, be machined from wood or a metal to accommodate the electronics. The housing 101 may also be molded from a plastic. The electronics are contained within the housing 101, and are made weather resistant through the use of gaskets, sealants, and other techniques that are well known to those skilled in the art.

To use the electronic carpenter bee trap, the trap is placed in an area where carpenter bees are known to be a problem, often times near a house or building, or physically attached to a house or building. The electronic carpenter bee trap is left undisturbed, and over time, carpenter bees that are investigating suitable nesting locations will come upon the electronic carpenter bee trap, observe the entry hole, and upon entering the entry hole, will make contact with energized electrodes and be destroyed. The dead carpenter bee will then drop from the entry hole, and the electronic carpenter bee trap will be ready to destroy the next carpenter bee that enters the entry hole. The electronic carpenter bee trap will eliminate carpenter bees before they have a chance to infest and damage a house or building. Several traps may be placed at various locations near a building or house to increase the area of protection.

Figure 2:
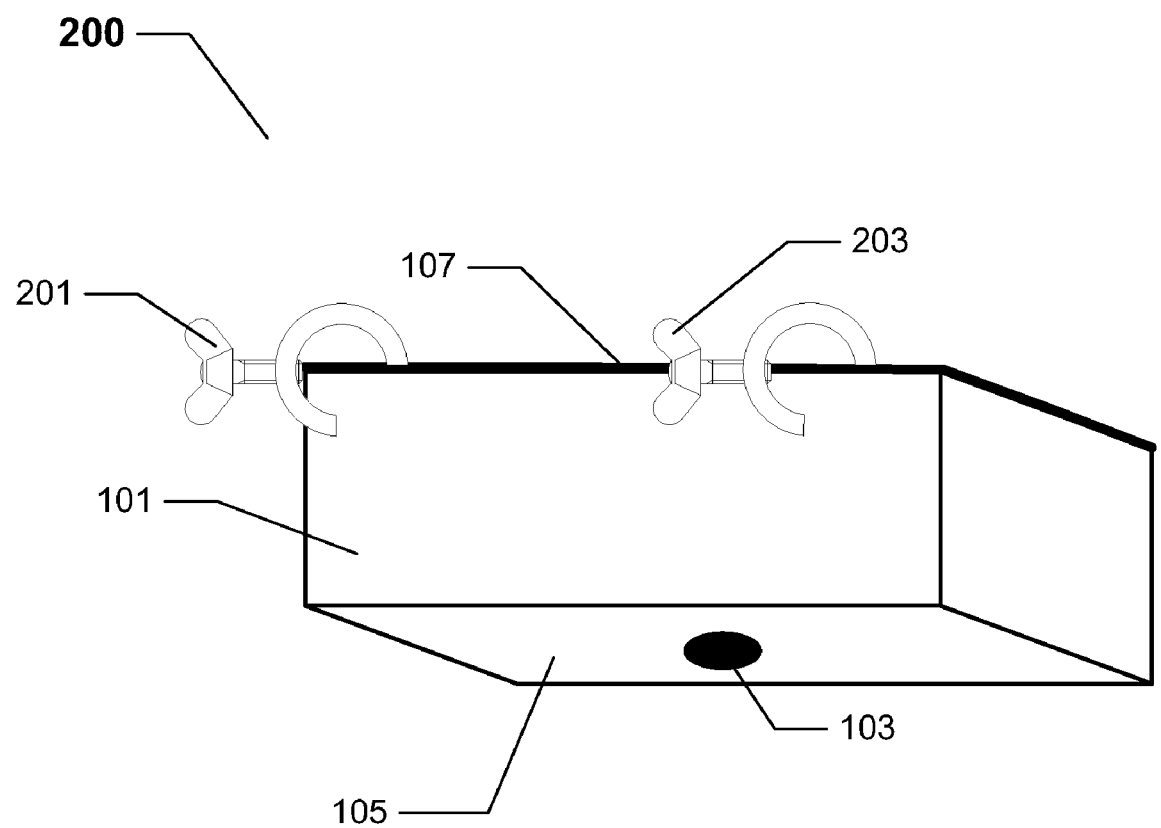
FIG. 2 is a perspective view of an electronic carpenter bee trap with mounting clamps.

FIG. 2 shows a perspective view of an electronic carpenter bee trap with mounting clamps 200. A first clamp 201, and in some embodiments of the present invention, a second clamp 203, are attached to the housing 101. The clamps can be c-clamps, ratchet clamps, pressure clamps, hose clamps, or another style clamp that allows the electronic carpenter bee trap to be mounted to a house or a building. An example of a mounting location for the electronic carpenter bee trap is on the gutter of a building. A gutter provides an open lip upon which the electronic carpenter bee trap with clamps 200 can be safely mounted. For added safety, the electronic carpenter bee trap with clamps 200 can also be fitted with a wire or string (not shown) and attached to a gutter nail or gutter bracket as an added safety measure.

In some embodiments of the present invention, the electronic carpenter bee trap may be attached to a tree using screws, nails, wire, or other fastening techniques known to those skilled in the art.

Figure 3:
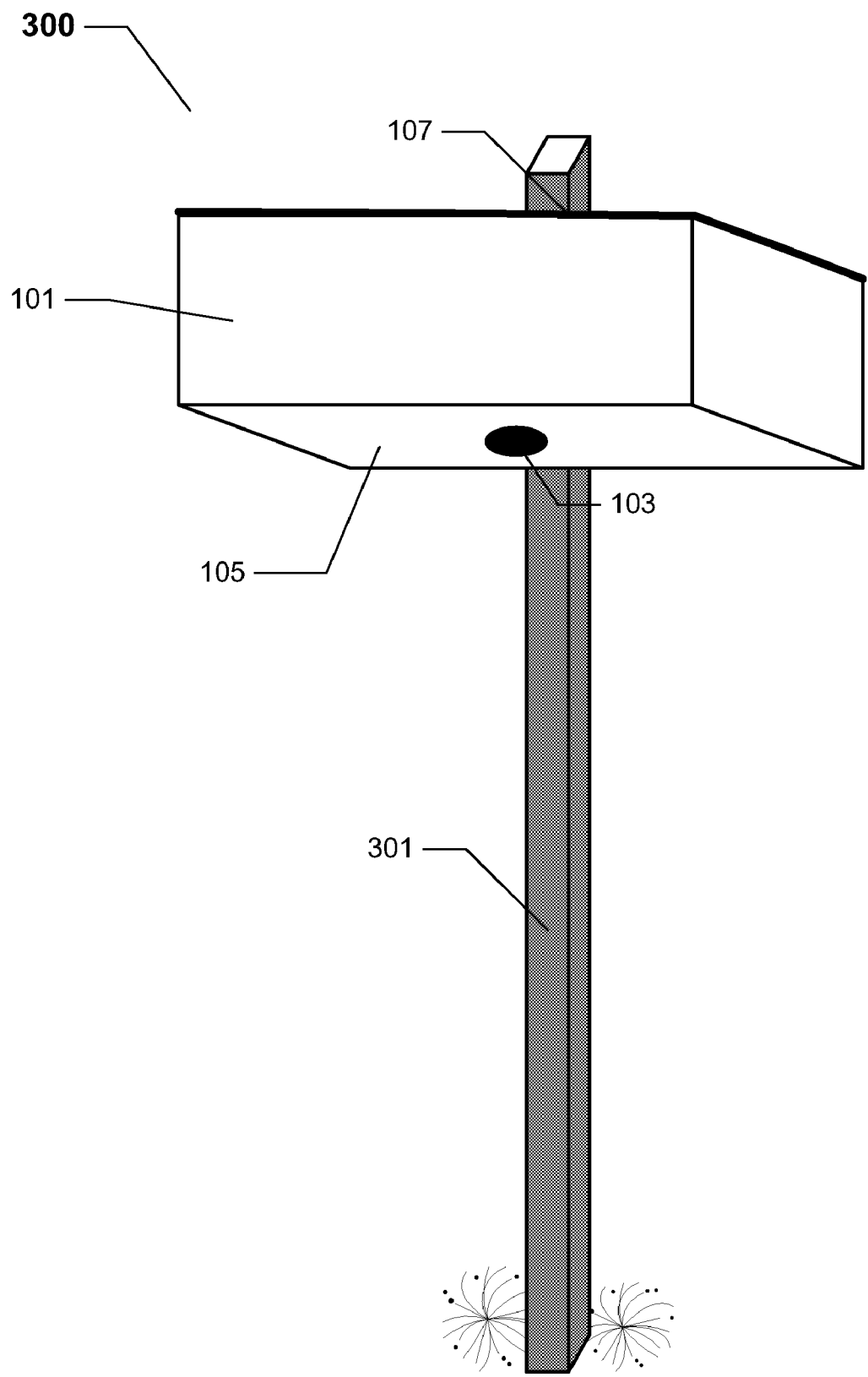
FIG. 3 is a perspective view of an electronic carpenter bee trap attached to a post.

Turning now to FIG. 3, a perspective view of an electronic carpenter bee trap attached to a post is shown. For situations where attaching an electronic carpenter bee trap to a house or a building is not practical or desired, the electronic carpenter bee trap may be attached to a post 301 and driven into the ground. The post 301 may be made of wood, metal, plastic, or the like.

Figure 4:
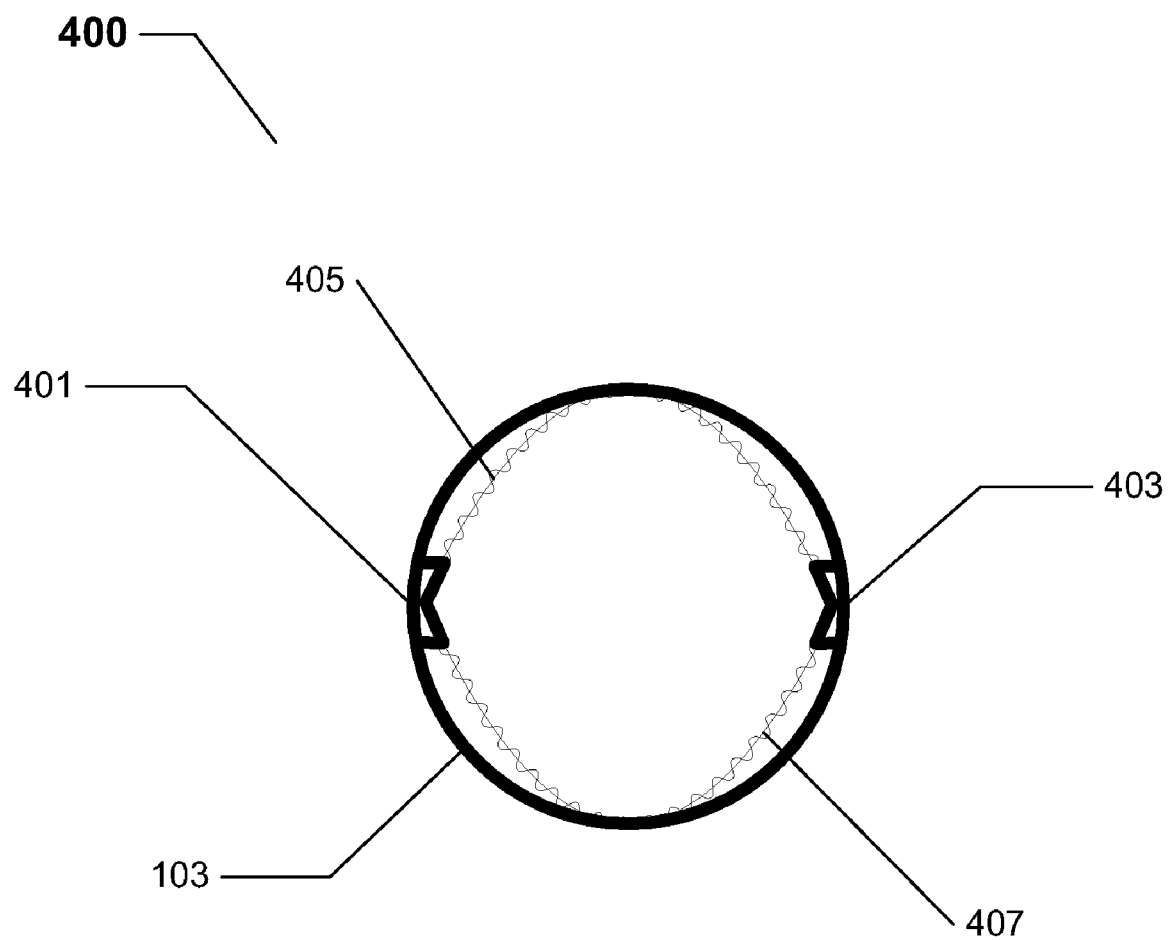
FIG. 4 is a plan view of an entry hole for an electronic carpenter bee trap showing electrodes that are used to kill carpenter bees.

FIG. 4 shows a plan view of an entry hole assembly 400. The entry hole 103 that is illustrated by way of FIG. 4 does not show the surrounding housing of the electronic carpenter bee trap 100 for the purpose of clarity. Within the entry hole 103, a first electrode 405 and a second electrode 407 are attached. In some embodiments of the present invention, additional electrodes may be added. The first electrode 405 and the second electrode 407 are made of a conductive metal such as copper, brass, steel, stainless steel, gold, silver, aluminum, or the like. The first electrode 405 and the second electrode 407 may, in some embodiments of the present invention, be curved, spiral, or contain an irregular surface to increase the probability of electrical contact between the electrode and the carpenter bee. The electrodes may be placed at any point along the entry hole. In some embodiments of the present invention, the entry hole may make a right angle turn, similar to the hole structure made by a carpenter bee (see FIG. 7), and the electrodes may be placed at any point along this right angle hole structure. The electrodes are retained in proximity of the entry hole by a first retainer 401 and a second retainer 403. In some embodiments of the present invention, additional retainers may be added. The first retainer 401 and the second retainer 403 are made from an insulating material such as a plastic, ceramic, rubber, or the like. Upon entering the entry hole 103, the carpenter bee will make physical contact with the first electrode 405 and the second electrode 407, thus completing an electrical circuit where electrical charge is transferred through the carpenter bee, causing the carpenter bee to die. The carpenter bee will fall from the entry hole 103, readying the electronic carpenter bee trap for the next carpenter bee.

Figure 5:
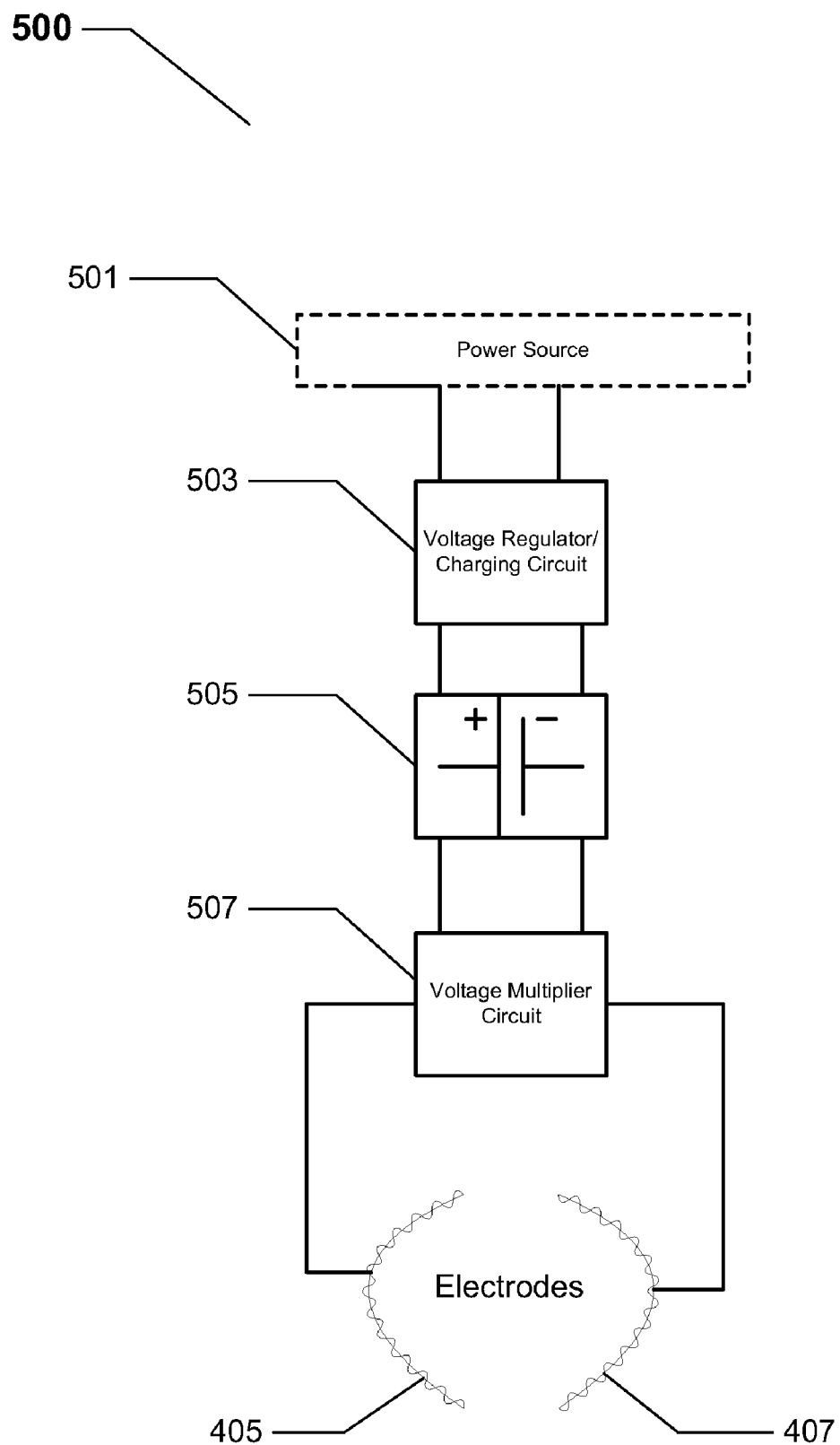
FIG. 5 is a block diagram of circuitry used to energize electrodes that are used to kill carpenter bees.

FIG. 5 is a block diagram 500 of circuitry used to energize electrodes that are used to kill carpenter bees. A power source 501 is used to charge a charge storage device 505 such as a battery or an ultracapacitor. The power source 501, in one embodiment of the present invention, is a photovoltaic panel such as the solar panel 107 illustrated in FIGS. 1, 2 and 3. The solar panel 107 provides the electronic carpenter bee trap with a source of renewable and clean power, and does not require wires, extension cords, or electrical outlets. In addition, carpenter bees are most active during periods of bright sunshine, making this form of energy highly practical. To provide for an instantaneous burst of energy sufficient to kill a carpenter bee, the power source 501 is connected to a voltage regulator/charging circuit 503 that is in turn connected to a charge storage device 505 such as a battery or an ultracapacitor. Batteries include sealed lead acid batteries, Nickel Metal Hydride batteries, Nickel Cadmium Batteries, Lithium Ion batteries, and other batteries that are capable of being charged and discharged repeatedly. The charge storage device 505 is in turn connected to a voltage multiplier circuit 507. Voltage multiplier circuits are well known to those skilled in the art, and may include capacitors and rectifiers. The voltage multiplier circuit 507 is connected to a first electrode 405 and a second electrode 407. The first electrode 405 and the second electrode 407 are located in proximity to the entry hole 103, as has been clearly illustrated and described by way of FIG. 4.

Figure 6:
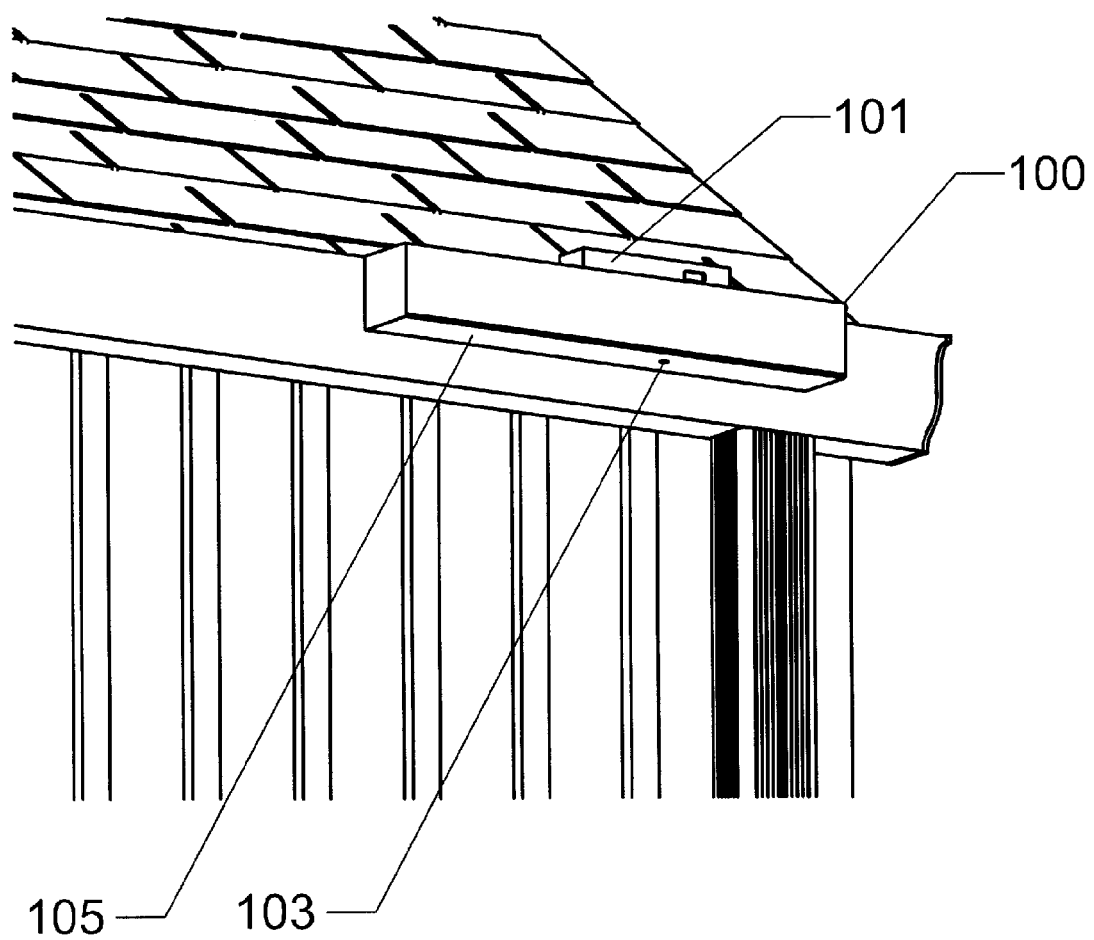
FIG. 6 illustrates one embodiment of the electronic carpenter bee trap in use protecting a cedar sided house.

Turning now to FIG. 6, there is shown an electronic carpenter bee trap 100 according to one embodiment of the present invention, in use protecting a cedar sided house. The electronic carpenter bee trap 100, as shown in FIG. 6, is attached to the gutter of a house by way of clamps (not shown), such as the clamps previously depicted in FIG. 2. The bottom 105 of the electronic carpenter bee trap, in the embodiment depicted, is wood. Other materials that resemble wood, such as various plastics, may also be used. The entry hole 103 is shown projecting downward from the bottom 105 of the electronic carpenter bee trap. The entry hole contains electrodes, as described previously in this specification. The electrodes are not visible in FIG. 6. The housing 101 is a weathertight enclosure that contains the electronics that have been previously described in this specification and by way of FIG. 5. Carpenter bees looking for suitable infestation sites were observed to preferentially enter the entry hole 103 of the carpenter bee trap 100, where they encountered energized electrodes and were electrocuted. The unit depicted in FIG. 6 was installed on gutters of the inventor's cedar sided house in the spring of 2006, and it was noted that by early July of 2006 there were no remaining carpenter bees or their associated structural damage evident in or around the cedar sided house.

Figure 7:
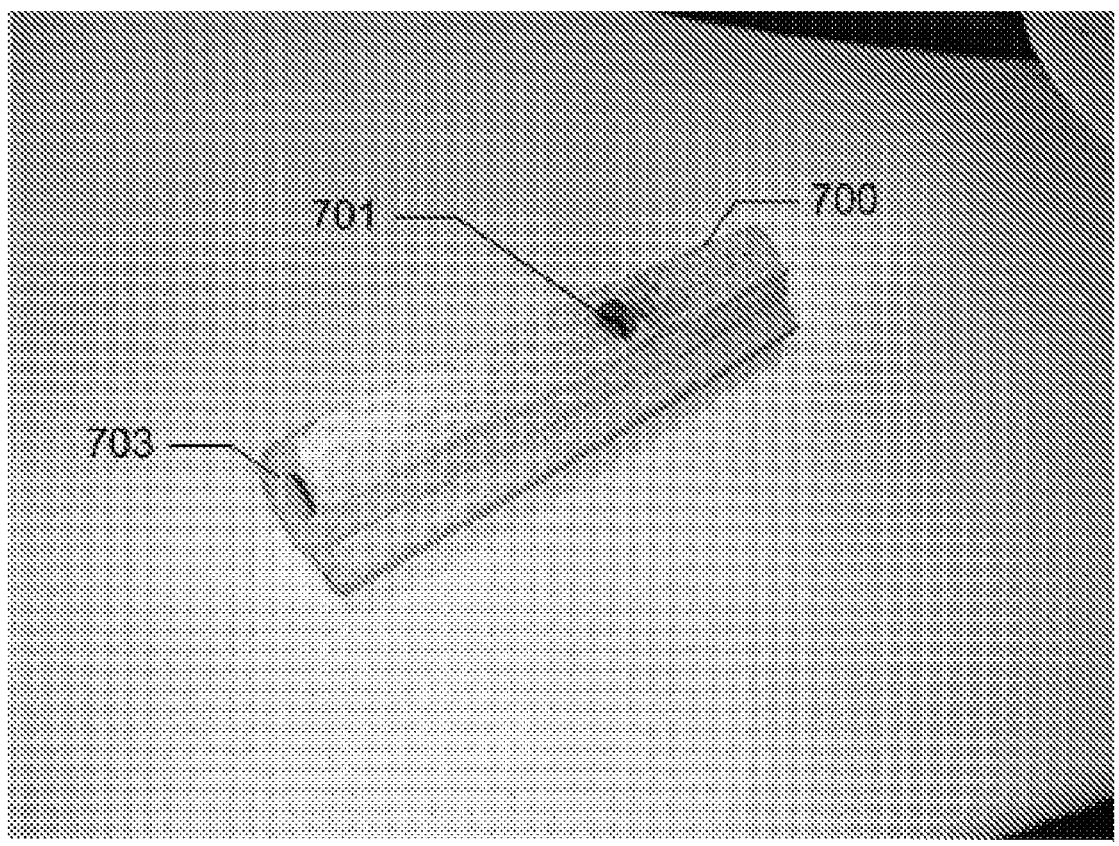
FIG. 7 is a cross sectional view of a pine board that was damaged by a carpenter bee.

Lastly, FIG. 7 is a cross sectional view of a pine board 700 that was damaged by a carpenter bee. The carpenter bee bored a hole 701 in the board, and made a right angle turn in the board. The board was cut at the ends to show the burrow 703 that was made by the carpenter bee.

It is, therefore, apparent that there has been provided, in accordance with the various objects of the present invention, an apparatus for trapping and killing carpenter bees. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification and the claims appended herein.

What is claimed is:

1. An electronic insect trap comprising a housing having a top, a bottom extending within a horizontal plane, and a generally round hole that extends through the bottom of said housing for the entry of insects, said hole being open to and communicating with the ambient enviroment and of a size similar to the holes normally made by carpenter bees, an entry hole area constituting less than 25% of an area of a lower exterior surface of the housing, an electrode assembly within the housing and in proximity to said hole, and a power source electronically connected to said electrode assembly; and wherein light cannot pass through any other part of the insect trap except for the entry hole.

2. The electronic insect trap of claim 1, wherein the hole has a diameter within the range of from about 5/16 inch to about 3/4 inch.

3. The electronic insect trap of claim 1, wherein the housing is made from wood.

4. The electronic insect trap of claim 1, wherein the housing is made from a plastic.

5. The electronic insect trap of claim 1, wherein the power source is a battery.

6. The electronic insect trap of claim 1, wherein the power source is an ultracapacitor.

7. The electronic insect trap of claim 1, further including a solar panel operatively connected to the power source.

8. The electronic insect trap of claim 1, wherein the power source is a solar panel.

9. The electronic insect trap of claim 1, further including mounting clamps attached to said housing for attaching the carpenter bee trap to a structure.

10. A carpenter bee trap comprising a housing having a top, a bottom extending within a horizontal plane, and a generally round entry hole that extends through the bottom of the housing to entice carpenter bees to enter the housing, said entry hole being open to and communicating with the ambient enviroment and of a size similar to the holes normally made by carpenter bees, an entry hole area constituting less than 25% of an area of a lower exterior surface of the housing, an electrode assembly within the housing and in proximity to said hole, and a power source electronically connected to said electrode assembly; and wherein light cannot pass through any other part of the carpenter bee trap except for the entry hole.

11. A carpenter bee trap comprising a housing having a top, a bottom extending within a horizontal plane, and a generally round entry hole that extends through the bottom of the housing to entice carpenter bees to enter the housing, said entry hole being open to and communicating with the ambient enviroment and of a size similar to the holes normally made by carpenter bees, an entry hole area constituting less than 25% of an area of the bottom of the housing, an electrode assembly within the housing and in proximity to said hole, and a power source electronically connected to said electrode assembly; and wherein light cannot pass through any other part of the carpenter bee trap except for the entry hole.

12. The carpenter bee trap of claim 1, wherein the hole has a diameter within the range of from about 5/16 inch to about 3/4 inch.

13. The carpenter bee trap of claim 1, wherein the housing is made from wood.

14. The carpenter bee trap of claim 1, wherein the housing is made from a plastic.

15. The carpenter bee trap of claim 1, wherein the power source is a battery.

16. The carpenter bee trap of claim 1, wherein the power source is an ultracapacitor.

17. The carpenter bee trap of claim 1, further including a solar panel operatively connected to the power source.

18. The carpenter bee trap of claim 1, wherein the power source is a solar panel.

19. The carpenter bee trap of claim 1, further including mounting clamps attached to said housing for attaching the carpenter bee trap to a structure.

20. The carpenter bee trap of claim 19, wherein the mounting clamps are gutter clamps.

* * * * *

UNITED STATES PATENT AND TRADEMARK OFFICE
CERTIFICATE OF CORRECTION

| | |
|---|---|
| PATENT NO. | : 7,757,432 B2 |
| APPLICATION NO. | : 11/456210 |
| DATED | : July 20, 2010 |
| INVENTOR(S) | : Robert Dale Gunderman, Jr. |

It is certified that error appears in the above-identified patent and that said Letters Patent is hereby corrected as shown below:

Column 6, lines 44-61, in claims 12-19, for the claim reference numeral '1', each occurrence, should read -10-. (dependent claims 12-19 should refer back to claim 10, not claim 1).

Signed and Sealed this
Fifteenth Day of May, 2012

David J. Kappos
*Director of the United States Patent and Trademark Office*